United States Patent
Tidwell et al.

(10) Patent No.: US 9,954,843 B2
(45) Date of Patent: Apr. 24, 2018

(54) WEB TICKET BASED UPON A SYMMETRIC KEY USABLE FOR USER AUTHENTICATION

(71) Applicant: Microsoft Corporation, Redmond, WA (US)

(72) Inventors: Paul Tidwell, Sammammish, WA (US); Yves Pitsch, Mercer Island, WA (US); Deepak Rao, Issaquah, WA (US); Vadim Eydelman, Bellevue, WA (US); Satya Kondepudi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/925,854

(22) Filed: Jun. 25, 2013

(65) Prior Publication Data
US 2014/0245420 A1 Aug. 28, 2014

Related U.S. Application Data

(60) Provisional application No. 61/771,073, filed on Feb. 28, 2013.

(51) Int. Cl.
*H04L 29/06* (2006.01)
*H04L 9/32* (2006.01)
(Continued)

(52) U.S. Cl.
CPC ........ *H04L 63/0807* (2013.01); *G06F 21/335* (2013.01); *G06F 21/57* (2013.01);
(Continued)

(58) Field of Classification Search
CPC . H04L 63/0815; H04L 63/0807; H04L 67/02; H04L 63/08; H04L 29/06;
(Continued)

(56) References Cited

U.S. PATENT DOCUMENTS 6,065,117 A 5/2000 White
6,263,432 B1 * 7/2001 Sasmazel et al. ............ 713/100
(Continued)

FOREIGN PATENT DOCUMENTS

CN 101926127 A 12/2010
CN 102047708 A 5/2011
(Continued)

OTHER PUBLICATIONS

Microsoft, Lync 2010 Integration. http://technet.microsoft.com/en-us/library/gg398806(v=ocs.14).aspx . 2012.*
(Continued)

*Primary Examiner* — Michael Simitoski
(74) *Attorney, Agent, or Firm* — Medley, Behrens & Lewis, LLC

(57) ABSTRACT

Described herein are various aspects pertaining to a web ticket that is used in connection with authenticating a user. The web ticket is generated through use of a symmetric key, and is less than two hundred bytes in size. A ticket issuer executing on a first computing device generates the web ticket responsive to receiving authentication data from a client computing device, and transmits the web ticket to such client computing device. The client computing device includes the web ticket in requests for data transmitted to a second server computing device that is in communication with the ticket issuer. The second server computing device includes a validator that validates the web ticket using the symmetric key, which is shared between the first server and the second server.

20 Claims, 9 Drawing Sheets

(51) Int. Cl.
| | |
|---|---|
| *H04L 29/08* | (2006.01) |
| *G06F 21/33* | (2013.01) |
| *G06F 21/57* | (2013.01) |
| *G06F 21/62* | (2013.01) |

(52) U.S. Cl.
CPC ............ *G06F 21/629* (2013.01); *H04L 65/40* (2013.01); *H04L 67/02* (2013.01); *H04L 67/10* (2013.01); *H04L 67/1095* (2013.01); *H04L 67/2814* (2013.01); *H04L 67/327* (2013.01)

(58) Field of Classification Search
CPC ..... H04L 63/0435; G06F 21/41; G06F 21/31; G06F 21/335
USPC ............................................ 708/135; 341/20
See application file for complete search history.

(56) References Cited

U.S. PATENT DOCUMENTS

| | | | |
|---|---|---|---|
| 6,405,216 B1 | 6/2002 | Minnaert et al. | |
| 6,421,768 B1* | 7/2002 | Purpura | 711/164 |
| 7,010,600 B1* | 3/2006 | Prasad et al. | 709/225 |
| 7,055,032 B2* | 5/2006 | Sandhu et al. | 713/171 |
| 7,137,006 B1* | 11/2006 | Grandcolas et al. | 713/180 |
| 7,188,181 B1* | 3/2007 | Squier et al. | 709/228 |
| 7,818,792 B2* | 10/2010 | Shamsaasef et al. | 726/10 |
| 8,069,435 B1* | 11/2011 | Lai | 717/106 |
| 8,095,972 B1* | 1/2012 | Floyd et al. | 726/9 |
| 8,195,626 B1* | 6/2012 | Goodwin | 707/693 |
| 8,225,385 B2* | 7/2012 | Chow | H04L 63/08 713/168 |
| 8,527,631 B1* | 9/2013 | Liang | H04L 63/12 709/225 |
| 8,856,869 B1* | 10/2014 | Brinskelle | H04L 63/08 726/12 |
| 9,397,861 B1* | 7/2016 | Tovino | H04L 12/589 |
| 2002/0078144 A1* | 6/2002 | Lamkin | G06F 17/30017 709/203 |
| 2002/0112155 A1* | 8/2002 | Martherus et al. | 713/155 |
| 2002/0138728 A1* | 9/2002 | Parfenov et al. | 713/170 |
| 2002/0150253 A1* | 10/2002 | Brezak et al. | 380/281 |
| 2002/0169961 A1* | 11/2002 | Giles et al. | 713/175 |
| 2003/0033535 A1* | 2/2003 | Fisher et al. | 713/185 |
| 2003/0037237 A1* | 2/2003 | Abgrall et al. | 713/166 |
| 2003/0217288 A1* | 11/2003 | Guo | G06F 21/33 726/10 |
| 2004/0061719 A1 | 4/2004 | Barsness et al. | |
| 2004/0156491 A1* | 8/2004 | Reding | H04M 3/42059 379/201.02 |
| 2006/0095526 A1* | 5/2006 | Levergood et al. | 709/206 |
| 2006/0101114 A1* | 5/2006 | Sandhu et al. | 709/203 |
| 2006/0174110 A1* | 8/2006 | Strom et al. | 713/165 |
| 2006/0277596 A1* | 12/2006 | Calvert et al. | 726/3 |
| 2007/0067398 A1 | 3/2007 | Karmarkar | |
| 2007/0073625 A1* | 3/2007 | Shelton | G06Q 90/00 705/59 |
| 2007/0118886 A1* | 5/2007 | Martin | 726/5 |
| 2010/0002686 A1 | 1/2010 | Rosenberg et al. | |
| 2010/0011431 A1* | 1/2010 | Cynkin et al. | 726/9 |
| 2010/0306547 A1* | 12/2010 | Fallows | G06F 21/305 713/178 |
| 2010/0319063 A1 | 12/2010 | Koppolu et al. | |
| 2011/0154222 A1 | 6/2011 | Srinivasan et al. | |
| 2011/0231921 A1* | 9/2011 | Narayanan et al. | 726/9 |
| 2011/0307541 A1* | 12/2011 | Walsh et al. | 709/203 |
| 2012/0227094 A1* | 9/2012 | Begen et al. | 726/4 |
| 2012/0284804 A1* | 11/2012 | Lindquist et al. | 726/29 |
| 2013/0007150 A1* | 1/2013 | Hertz | H04L 51/32 709/206 |
| 2013/0054694 A1* | 2/2013 | Maeng | H04L 67/24 709/204 |
| 2013/0086381 A1* | 4/2013 | Thomas et al. | 713/168 |
| 2013/0097687 A1* | 4/2013 | Storm | 726/9 |
| 2013/0117768 A1* | 5/2013 | Gheorghe | H04L 51/28 719/328 |
| 2014/0019626 A1* | 1/2014 | Hubler et al. | 709/227 |
| 2014/0032902 A1* | 1/2014 | Agrawal et al. | 713/168 |

FOREIGN PATENT DOCUMENTS

| | | |
|---|---|---|
| CN | 102077550 A | 5/2011 |
| CN | 102196035 A | 9/2011 |
| CN | 102812665 A | 12/2012 |
| CN | 102904619 A | 1/2013 |

OTHER PUBLICATIONS

Lin, Ping, et al. "Single Sign-On for multiple unified communications applications." Internet Security (WorldCIS), 2012 World Congress on. IEEE, 2012.*

Menezes, Alfred J. et al. Handbook of Applied Cryptography, 1997 CRC Press, LLC, pp. 321-383.*

"Public Mashery/iodocs", Retrieved at <<https://github.com/mashery/iodocs>>, Retrieved Date: Mar. 13, 2013, p. 11.

"Document your API with Style", Retrieved at <<https://developers.helloreverb.com/swagger/>>, Retrieved Date: Mar. 13, 2013, pp. 1-4.

Stokes, Luke, "Hypermedia Dog Food", Retrieved at <<http://www.foxycart.com/blog/hypermedia-dog-food#. UUFNoNZmiSp>> Jan. 24, 2013, pp. 1-4.

Duvall, Paul, "Automation for the People: Pushbutton Documentation", Retrieved at <<http://www.ibm.com/developerworks/library/j-ap06108/index.html>> Jun. 10, 2008, pp. 1-10.

Verborgh, et al., "Functional Descriptions as the Bridge Between Hypermedia APIs and The Semantic Web", Retrieved at <<http://ws-rest.org/2012/proc/a5-9-verborgh.pdf>>, In Proceedings of the Third International Workshop on RESTful Design, Apr. 17, 2012, pp. 1-8.

Gruenbaum, Peter, "Automated Documentation for Rest APIs", Retrieved at <<http://blog.programmableweb.com/2012/03/28/automated-documentation-for-rest-apis/>> Mar. 28, 2012, pp. 1-8.

"Visualize Code Dependencies on Dependency Graphs", Retrieved at <<http://msdn.microsoft.com/en-us/library/dd409453.aspx#Graphitems>> Retrieved Date: Mar. 18, 2013, pp. 1-26.

"Graphviz—Graph Visualization Software", Retrieved at <<http://graphviz.org/>> Retrieved Date: Mar. 18, 2013, pp. 1-3.

"Data-Driven Documents", Retrieved at <<http://d3js.org/>> Retrieved Date: Mar. 18, 2013, pp. 1-3.

"Arborjs", Retrieved at <<http://arborjs.org/>> Retrieved Date: Mar. 18, 2013, p. 1.

"Thinkmap", Retrieved at <<http://www.thinkmap.com/pressrelease.jsp?id=1306>> Retrieved Date: Mar. 18, 2013, pp. 1-3.

Johncla., "Lync Developer Roundtable: UCWA Overview", Retrieved at <<https://channel9.msdn.com/posts/Lync-Developer-Roundtable-UCWA-Overview>> Aug. 14, 2012, p. 1.

"International Search Report & Written Opinion for PCT Patent Application No. PCT/US2014/018465", dated Jun. 4, 2014, Filed Date: Feb. 26, 2014, 10 Pages.

"Office Action Issued in European Patent Application No. 14711354.2", dated Oct. 10, 2017, 5 Pages.

"First Office Action and Search Report Issued in Chinese Patent Application No. 201480011317.3", dated Sep. 30, 2017, 18 Pages.

"Office Action Issued in European Patent Application No. 14711354.2", dated May 3, 2017, 4 Pages.

* cited by examiner

WEB TICKET BASED UPON A SYMMETRIC KEY USABLE FOR USER AUTHENTICATION

RELATED APPLICATION

This application claims priority to U.S. Provisional Patent Application No. 61/771,073, filed Feb. 28, 2013, and entitled "UNIFIED COMMUNICATIONS TECHNOLOGIES," the entirety of which is incorporated herein by reference.

BACKGROUND

Conventional unified communications (UC) applications support multiple communications modalities including, but not limited to, voice communications (e.g., through integration with a telephone system), voicemail retention and management, video conferencing, meeting scheduling, meeting maintenance, desktop sharing, instant messaging, contacts management (e.g. maintaining a list of contacts of a user of the UC application), presence (e.g. monitoring availability of users of the UC application), group maintenance (e.g., retaining information that identifies groups of the user of the UC application), amongst other communications modalities. The UC application is typically a distributed application, with front-end software executing on client computing devices and back-end software executing on server computing devices, wherein the client computing devices are in network communication with the server computing devices.

Relatively recently, UC applications have been configured to execute on mobile computing devices, such as, mobile telephones, tablets (slates), and the like. The increased use of mobile computing devices, and therefore, the increased use of front-end UC software executing on mobile computing devices, has raised issues not previously associated with UC applications. For example, a data plan corresponding to a mobile telephone may limit an amount of data that can be uploaded and/or downloaded by the mobile computing device (without the user incurring fees that are in addition to monthly plan fees). Further, when using the UC application on a mobile computing device, a user typically causes such application to be executed in foreground for a relatively small amount of time, and subsequently causes the UC application to execute in the background. For instance, the user may participate in a relatively brief meeting through utilization of the UC application executing on the mobile telephone, and thereafter place the telephone in a pocket or bag. In contrast, users of the UC application executing on a desktop computing device tend to allow the application to continuously execute in the foreground.

Conventional tokens utilized to authenticate a user of a UC application tend to be relatively large, such as on the order of 4 kilobytes. If the UC application is configured to cause the user to transmit the token with every request made to servers executing back-end software of the UC application, the relatively large payload of such request (caused at least partially by the relatively large token) can cause the application to execute sub-optimally, and further may result in additional fees being charged to the user for exceeding a data plan. Further, conventional back-end software of UC applications are configured to retain session identifiers for each UC client deemed as being active, wherein the UC client is typically deemed as being active for at least several hours after communicating with a server used in the UC application. Retaining numerous session identifiers limits the scalability of the UC application, in that resources are reserved to maintain session identifiers. Further, with respect to portable computing devices, maintaining session identifiers for long periods of time is wasteful since, as mentioned above, UC application users who log in using mobile computing devices typically do not remain active on the UC application.

SUMMARY

The following is a brief summary of subject matter that is described in greater detail herein. This summary is not intended to be limiting as to the scope of the claims.

Described herein are various technologies pertaining to creation and use of a web ticket in connection with authenticating a user, wherein the web ticket is of a relatively small size (e.g., 200 bytes or less), and wherein the web ticket comprises a signature that is based upon a symmetric key shared between server computing devices used in a system to which the user is authenticating. In an exemplary embodiment, the user can execute a client-side instance of a unified communications (UC) application on a client computing device, and wherein back-end software of the UC application desires to authenticate the user for each request made to the back-end software. Exemplary requests include a request to retrieve a list of contacts, a request for presence information of users of the UC application, a request to participate in a meeting, a request to initiate a voice call, etc. It is to be understood, however, that the technologies described herein pertaining to creation, maintenance, and use of web tickets can be utilized in other applications/settings where it is desirable to authenticate a user, such as bank applications, e-mail applications, etc. Furthermore, the technologies described herein may be particularly well-suited for when the user that is being authenticated is employing a mobile computing device, such as a mobile telephone, due to the relatively small size of the web ticket.

Pursuant to an example, a user can initiate an application on a client computing device (e.g., the UC application). The user may desire to authenticate to back-end software of the UC application, and can cause the client computing device to transmit authentication data to a server that is executing back-end software of the UC application. The authentication server can comprise a ticket issuer, which is a logical entity executing on the server. The ticket issuer receives the authentication, data and generates a web ticket responsive to receiving such authentication data. The ticket issuer utilizes a symmetric key to generate a signature that is included in the web ticket, wherein the ticket issuer can use the symmetric key to generate web tickets for a limited period of time (e.g., one hour). Further, the ticket issuer can include the following information in the web ticket with the signature: a ticket issuer identifier that identifiers the ticket issuer that generated the web ticket, a key identifier that identifies the key used to generate the signature, a user identifier that identifies the user, a time when the web ticket expires, amongst other data. Responsive to generating the web ticket, the ticket issuer transmits the web ticket to the requesting client computing device.

The ticket issuer can maintain a list of symmetric keys used to generate web tickets for a threshold amount of time. For instance, the ticket issuer can maintain the key used to generate the requested web ticket for eight hours in a list of keys. In an example, the ticket issuer can generate web tickets that expire after eight hours, and the ticket issuer can use a symmetric key for one hour when creating web tickets. Therefore, the ticket issuer can maintain a list of symmetric keys, wherein the list includes a current symmetric key used to generate web tickets and another eight most recent symmetric keys used to generate web tickets.

Subsequent to the client computing device receiving the web ticket, the client-side instance of the UC application may transmit a request for communications data (e.g., data that supports a communications modality) from another server that executes back-end software of the UC application. The another server can include a validator, which is a logical entity executing on the another server (or distributed across several servers) that is configured to authenticate the web ticket (and thus the user) and respond to requests for the communications data. For instance, the validator can support presence, such that the validator can provide data indicative of presence of users of the UC application. To authenticate the web ticket, the validator can read the ticket issuer identifier from the web ticket and request the list of symmetric keys maintained by the ticket issuer. The validator may also read the key identifier from the web ticket and identify the symmetric key in the list of symmetric keys that was used to generate the web ticket. The validator utilizes the symmetric key corresponding to the key identifier to authenticate the web ticket. Subsequent to authenticating the web ticket, the validator can generate a response to the request from the client-side instance of the UC application, wherein the response includes the communications data requested by the client-side instance of the UC application. In contrast, if the web ticket does not include certain fields, or is expired (as indicated in the web ticket), or does not include a valid key, etc., then the validator can deny the request.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
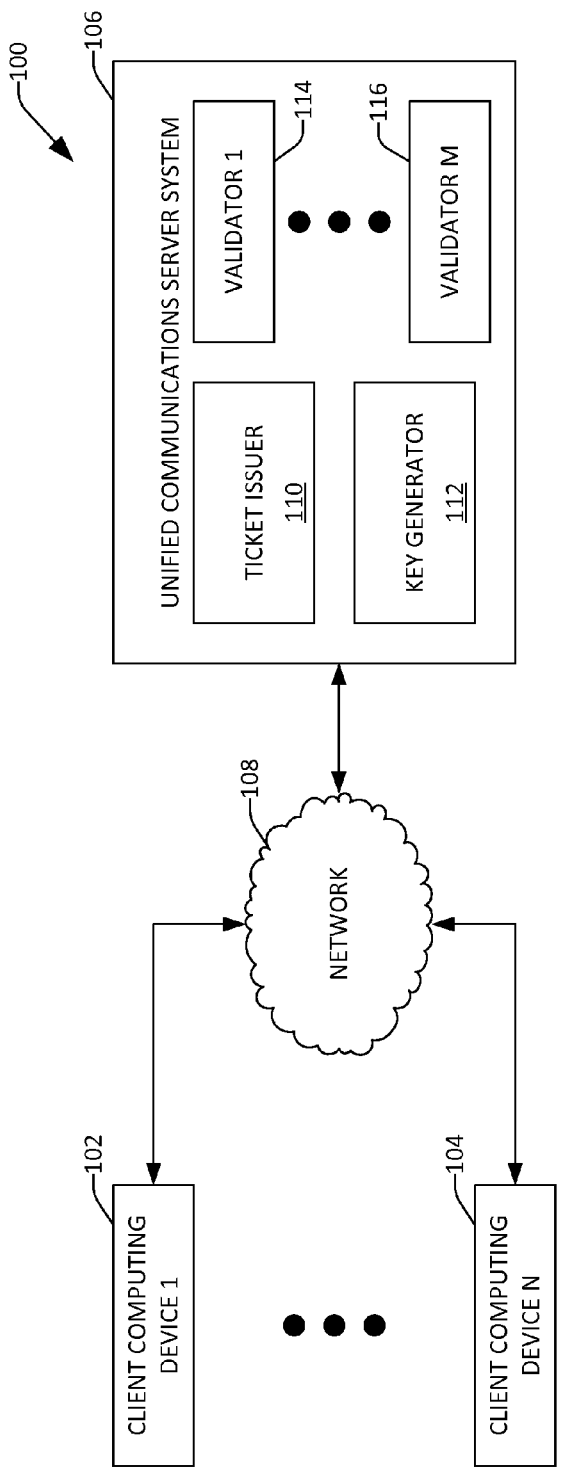
FIG. 1 is a functional block diagram of an exemplary system that facilitates generating web tickets for utilization in connection with authenticating a user to a server.

Various technologies pertaining to generation of a web ticket and use of the web ticket to authenticate a user to a server computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to the utilization of a web ticket to authenticate a user to a validating entity executing on a server computing device, wherein the web ticket includes a signature that is based upon a symmetric key. The symmetric key can be shared amongst servers that execute back-end software of an application to which the user desirably authenticates. To preserve security, the symmetric key is used in connection with generating web tickets for a relatively short amount of time, and thereafter a different symmetric key is used to generate web tickets. Accordingly, a web ticket generated for a first user at a first point in time may be based on a first symmetric key, while a web ticket for a second user generated at a second point in time may be based upon a second symmetric key. Utilization of symmetric keys to generate a web ticket allows for the payload of the web ticket to remain relatively small (e.g., 200 bytes or less). Accordingly, for instance, the web ticket can be readily appended to a uniform resource locator (URL) as a portion of a request, and the web ticket can be readily extracted from the URL in connection with authenticating the user.

With reference now to FIG. 1, an exemplary system 100 that facilitates the generation and use of web tickets in connection with authenticating users to server computing devices is illustrated. The system 100 is described in the context of a unified communications (UC) application. It is to be understood, however, that features described herein are not so limited. For example, features described herein are well-suited for any system to which a user desirably authenticates when the user is employing a mobile computing device. Furthermore, the features described herein may be well-suited for a system that includes multiple server computing devices that share symmetric keys therebetween.

The system 100 includes a plurality of client computing devices 102 through 104, wherein the client computing devices 102-104 can be or include at least one mobile computing device, such as a mobile telephone, tablet computing device, phablet computing device (e.g., a combination phone/tablet with a display screen of approximately 5 inches in diagonal), a portable media player, or the like. Additionally, the client computing devices 102-104 can include conventional desktop and/or laptop computing devices. Each client device in the client computing devices 102-104 can execute a respective client-side instance of the UC application. The UC application can support multiple modes of communications, including but not limited to voice communications, videoconferencing, instant messaging, presence, groups, screen sharing, voicemail, meeting organization, and the like.

The system 100 further comprises a UC server system 106, wherein the client computing devices 102-104 are in communication with the UC server system 106 (and with other client computing devices) by way of a network 108 (e.g. the Internet or an intranet). The UC server system 106 includes a plurality of server computing devices that respectively execute server-side instances (back-end software) of the UC application. The plurality of server computing devices can be in communication with one another by way of respective suitable communications channels.

The UC server system 106 includes a ticket issuer 110, a key generator 112, and a plurality of validators 114-116. The ticket issuer 110, key generator 112, and validators 114-116 are logical entities that execute on server computing devices in the UC server system 106. For example, the ticket issuer 110 may execute on a first server computing device while the key generator 112 may execute on a second server computing device. In another example, the ticket issuer 110 may execute in a distributed manner across a first plurality of server computing devices and the key generator 112 can execute in a distributed manner across a second plurality of server computing devices. In still yet another example, the ticket issuer 110 can execute on a first processor core or set of processor cores in a server computing device while the key generator 112 may execute on a second processor core or set of processor cores in the server computing device. Further, while the ticket issuer 110 and the key generator 112 are shown as being separate entities, in some embodiments, the ticket issuer 110 can be configured to perform functionality described herein as being performed by the key generator 112. Furthermore, it is to be understood that the UC server system 106 may include multiple ticket issuers and/or multiple key generators.

As indicated above, the system 100 facilitates generation and use of web tickets in connection with authenticating users to the validators 114-116 in the UC server system 106. To that end, in an example, the first client computing device 102 can execute a first client-side instance of the UC application and can transmit authentication data, such as a username and password, to the UC server system 106. The ticket issuer 110 can authenticate the user based upon the username and password, and can generate a web ticket for the user responsive to authenticating the authentication data provided by the first client computing device 102. The ticket issuer 110 can use a symmetric key to generate the web ticket. In an exemplary embodiment, the ticket issuer 110 can utilize a hash-based message authentication code (HMAC) protocol to create a signature based upon the symmetric key. Such signature, for example, can have a size of 32 bytes or 64 bytes. Additionally, the ticket issuer 110 can generate the web ticket such that the ticket includes multiple fields, wherein the fields include an identifier for the ticket issuer 110, a key identifier that identifies the symmetric key used to generate the web ticket, the signature, a time that the web ticket is to expire (e.g., the web ticket is valid only until the time indicated in the web ticket), at least one identifier for the user of the first client computing device 102, amongst other data. In an exemplary embodiment, the web ticket can be set to expire after a time window of more than one hour but less than one day (e.g., eight hours) has passed. The ticket issuer 110 may then transmit the web ticket by way of the network 108 to the first client computing device 102.

Subsequent to receiving the web ticket, the first client computing device 102 can transmit a request to the UC server system 106 for communications data for a communications modality desirably utilized at the first client computing device 102. For instance, the first client computing device 102 can transmit a request for a list of contacts of the user of the first client computing device 102. In an exemplary embodiment, such request can be in the form of an HTTP Uniform Resource Locator (URL) that is directed towards a particular server computing device in the UC server system 106 that can respond to the request. For instance, the URL can identify a server computing device that executes the first validator 114. Additionally, the web ticket is included in the request. Continuing with this example, the first validator 114 can receive the request and can analyze content of the web ticket to validate the web ticket, and thus authenticate the user. Specifically, the first validator 114 can read the data that identifies the ticket issuer 110 and the key identifier from the web ticket.

If the first validator 114 does not have access to an unexpired list of valid symmetric keys used by the ticket issuer 110 to generate web tickets, the first validator 114 can direct a request to the ticket issuer 110 for the list of symmetric keys, wherein symmetric keys in the list correspond to a time period in which the web ticket is valid. In an example, the web ticket may be valid for an 8-hour time window (e.g., eight hours after being generated by the ticket issuer 110). Further, the ticket issuer 110 may only use a symmetric key to generate web tickets for a smaller time window (e.g., one hour). Therefore, the collection of keys maintained by the ticket issuer 110 can be at least 9 keys (e.g., a symmetric key currently being used by the ticket issuer 110 and eight symmetric keys used by the ticket issuer 110 during the previous eight hours). The first validator 114 can use the key identifier in the web ticket to identify the key in the list of symmetric keys used by the ticket issuer 110 to generate the web ticket. The first validator 114 can then validate the web ticket using the symmetric key, and therefore may authenticate the user. Thereafter, the first validator 114 can generate a response to the request and transmit such response to the first client computing device 102. In this example, the first validator 114 can transmit the list of contacts to the first client computing device 102 responsive authenticating the user through use of the web ticket.

As size of the web ticket is relatively small (e.g., less than 200 bytes), a client computing device executing a client-side instance of the UC application can be configured to transmit a web ticket with each request made to a server in the UC server system 106. Once the web ticket has expired, the first client computing device 102 can request a new web ticket from the ticket issuer 110. Utilization of the web ticket in this manner also facilitates scaling of the UC server system 106 to allow more client computing devices to utilize services offered by the UC server system 106, as the UC server system 106 need not maintain a session identifier for each session in which the client computing devices 102-104 are participating with the UC server system 106. This is because the data included in the web ticket facilitates reconstitution of a session relatively quickly when a client computing device transmits a request to the UC server system 106. For instance, in addition to the information in the web ticket described above, the ticket issuer 110 can also include an identifier for a server computing device where traffic associated with the web ticket is to be terminated, an identifier for a session, etc.

Figure 2:
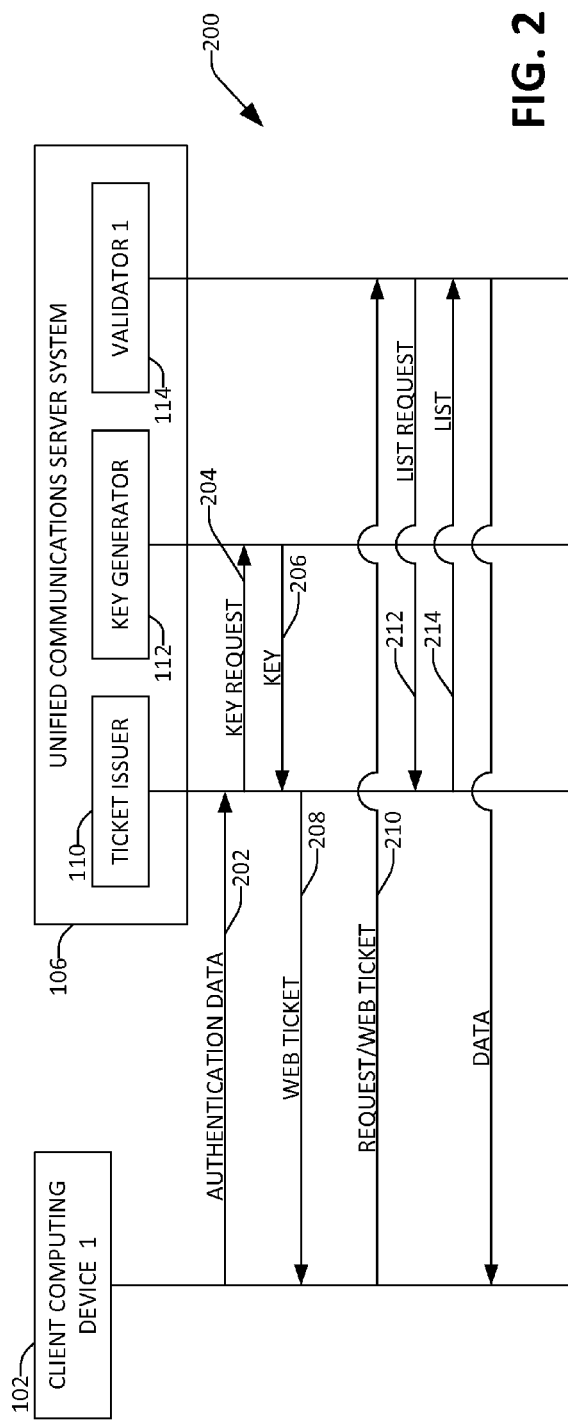
FIG. 2 is a communications diagram illustrating communications undertaken between a client and logical entities of a unified communication system in connection with authenticating the client to a validator.

Turning now to FIG. 2, an exemplary communications diagram 200 illustrating communications that can be undertaken between the first client computing device 102, the ticket issuer 110, the key generator 112, and the first validator 114 is illustrated. At 202, the first client computing device 102 transmits authentication data to the ticket issuer 110, wherein the authentication data may be a username and password or some other suitable data that can be used to identify the user of the first client computing device 102. The ticket issuer 110 may then authenticate the user based upon the authentication data received from the first client computing device 102. Responsive to authenticating the user, the ticket issuer 110 can commence with generating a web ticket.

As noted above, the ticket issuer 110 is configured to generate the web ticket through utilization of a symmetric key. To reduce security deficiencies corresponding to symmetric key encryption schemes, the ticket issuer 110 can use any one key to generate web tickets for a relatively small window of time (e.g., one hour). Thus, if the window of time is one hour, the ticket issuer 110 uses a different symmetric key each hour to generate web tickets. It is to be understood, however, that it may be desirable to cause the web ticket to be valid for a longer period of time than the window of time that the ticket issuer 110 uses symmetric keys to generate web tickets. Therefore, the ticket issuer 110 can maintain a collection (list) of symmetric keys corresponding to valid web tickets, discarding older keys as they become stale and replacing them with newer keys used by the ticket issuer 110 to create web tickets.

Accordingly, responsive to authenticating the user based upon the authentication data transmitted to the ticket issuer 110 at 202, the ticket issuer 110 can ascertain if it has access to a symmetric key that remains valid for generating web tickets (e.g., has not been used to generate web tickets for longer than one hour). If the ticket issuer 110 does not have access to a key suitable for generating the web ticket, then at 204 the ticket issuer 110 transmits a request for a key to the key generator 112. The key generator 112 utilizes a random number generator or pseudo-random number generator to generate at least one key, and at 206 provides the at least one key to the ticket issuer 110. If the request for the key is a first request for a key from the ticket issuer 110, then the key generator 112 can be configured to transmit multiple keys to the ticket issuer 110 at 206 (e.g., a first key for the ticket issuer 110 to utilize immediately, and one or more keys to utilize subsequent to the first key expiring).

If the ticket issuer 110 has access to a valid symmetric key or responsive to receiving the symmetric key from the key generator 112, at 208 the ticket issuer 110 can generate the web ticket and transmit the web ticket to the first client computing device 102. Thereafter, the first client computing device 102 may generate a request for communications data that supports a communications modality desirably undertaken at the first client computing device 102 (wherein the communications data is accessible to the first validator 114). The first client computing device 102 includes the web ticket in the request, and at 210 transmits the request to the first validator 114. To validate the web ticket, the first validator 114 needs knowledge of the symmetric key used by the ticket issuer 110 to generate the web ticket. Accordingly, the first validator 114 can analyze the web ticket received from the first client computing device 102 and identifies the ticket issuer 110 based upon content of the web ticket. The first validator 114 can locally search to ascertain if it already has access to a valid list of symmetric keys used by the ticket issuer 110 to generate web tickers. If the first validator 114 does not have access to such list, then at 212, the first validator transmits a request to the ticket issuer 110 for the list of symmetric keys maintained by the ticket issuer 110. For example, if the web ticket is valid for eight hours and the ticket issuer 110 uses a symmetric key for only one hour when generating web tickets, then the key collection maintained by the ticket issuer 110 can include at least nine keys.

At 214, the ticket issuer 110 transmits the list of keys to the first validator 114. The first validator 114 may then identify the key used by the ticker issuer 110 to generate the web ticket based upon the key identifier in the web ticket. Using such key, the first validator 114 can validate the web ticket, and thereby authenticate the user. Responsive to validating the web ticket, at 216 the first validator 114 can transmit a response to the first client computing device 102, wherein the response includes the communications data requested by the first client computing device 102.

Figure 3:
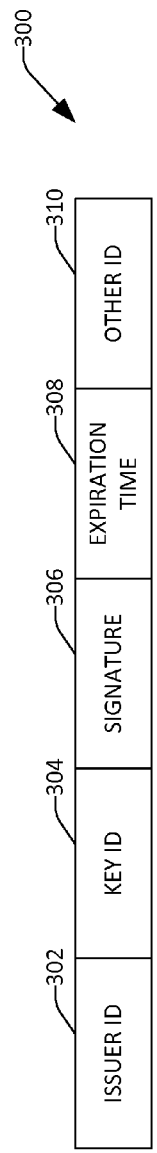
FIG. 3 illustrates an exemplary web ticket.

Now referring to FIG. 3, an exemplary web ticket 300 is illustrated. The web ticket 300 includes a first field 302 that comprises an issuer identifier that identifies a ticket issuer that generated the web ticket 300. The web ticket 300 further includes a second field 304 that comprises a key identifier that identifies a symmetric key utilized to generate the web ticket 300 by the ticket issuer identified in the first field 302. To be clear, the key identifier in the second field 304 is not the symmetric key itself; rather the key identifier is a value that can be used to look up the symmetric key in a database. The web ticket 300 also comprises a third field 306 that includes a signature that is generated based upon the symmetric key identified in the second field 304. A fourth field 308 of the web ticket 300 identifies a time that the web ticket 300 is to expire. For instance, the ticket issuer identified in the first field 302 can set the expiration time identified in the fourth field 308 as being some threshold amount of time after the ticket issuer generated the web ticket 300 (e.g., eight hours from the time that the ticket issuer generated the web ticket). The web ticket 300 also includes a fifth field 310 that can comprise some other identifier, such as an identifier of an organizer of a conference in which the user is going to participate, a user identifier, a session identifier, etc.

Figure 4:
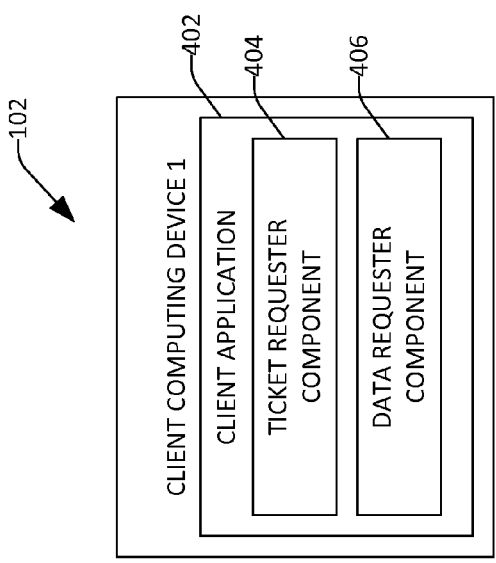
FIG. 4 is a functional block diagram of an exemplary client computing device that is configured to authenticate to a server through use of a web ticket.

Now referring to FIG. 4, an exemplary depiction of the first client computing device 102 is illustrated. The first client computing 102 executes a client-side instance of an application 402 (e.g., a UC application). The application 402 includes a ticket requester component 404 that is configured to request a web ticket from a ticket issuer. In an exemplary embodiment, the ticket requester component 404 can request the web ticket by transmitting a username and password to the ticket issuer. The client application 402 also includes a data requester component 406 that transmits a request for communications data to a validator, wherein the request includes the web ticket. Responsive to receiving a response to the request transmitted by the data requester component 406, the client application 402 can be configured to update graphical content displayed on a display screen of the first client computing device 102. In an example, the data requester component 406 can transmit a request for a contacts list of the user of the first client computing device 102. When a response to the request is received, the client application 402 can cause such contact list or a portion thereof to be displayed on the display screen of the first client computing device 102.

Figure 5:
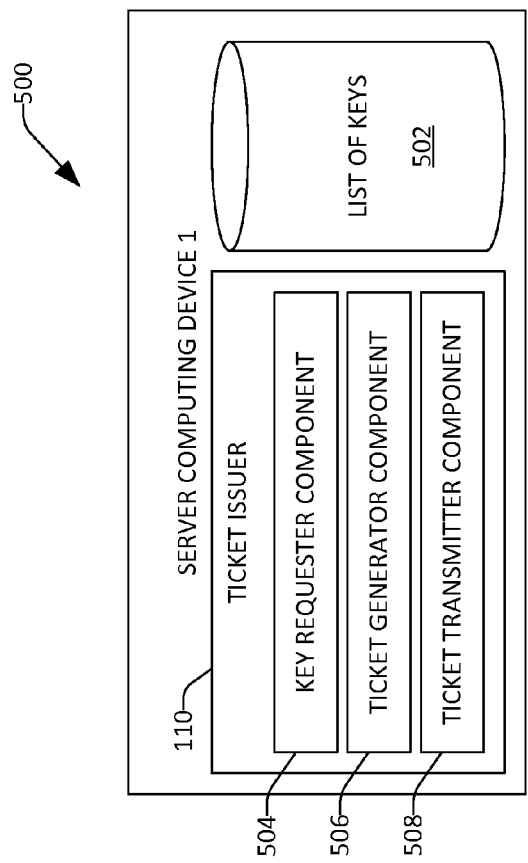
FIG. 5 is a functional block diagram of an exemplary server computing device that comprises a ticket issuer that is configured to generate a web ticket for a requesting client computing device.

Now referring to FIG. 5, an exemplary first server computing device 500 that can be included in the UC server system 106 is illustrated. The first server computing device 500 executes the ticket issuer 110. The first server computing device 500 also includes a data repository 502 that comprises a list of symmetric keys, wherein keys in the list of symmetric keys are associated with valid (unexpired) web tickets. As noted above, the ticket issuer 110 receives a request for a web ticket from a client computing device. The ticket issuer 110 accesses the data repository 502 to ascertain if a most recent key in the list of keys can be used to generate a web ticket for the requesting client computing device. If the list of keys does not include a suitable symmetric key, then a key requester component 504 can request a symmetric key from a key generator executing on a different server in the UC server system 106. In another embodiment, the ticket issuer 110 can be configured with a key generator, and can cause the key generator to generate the symmetric key.

If the list of symmetric keys includes a suitable symmetric key, or responsive to receiving a new symmetric key from the key generator, a ticket generator component 506 can generate a web ticket for the client computing device that issued the request. The ticket issuer 110 also includes a ticket transmitter component 508 that transmits the web ticket to the requesting client computing device.

The ticket issuer 110 is also charged with maintaining the list of symmetric keys in the data repository 502. That is, the ticket issuer 110 is configured to remove a symmetric key from the list of symmetric keys after a threshold amount of time has passed from the key becoming usable by the ticket issuer 110 to generate a web ticket. Therefore, for instance, eight hours after a key has been first used by the ticket issuer 110 to generate a web ticket, the ticket issuer 110 can remove such key from the list of symmetric keys. Likewise, the ticket issuer 110 can add a key to the list of keys when the key is received from the key generator 112. Accordingly, as a new key is added to the list of keys, an oldest key can be removed from such list.

Figure 6:
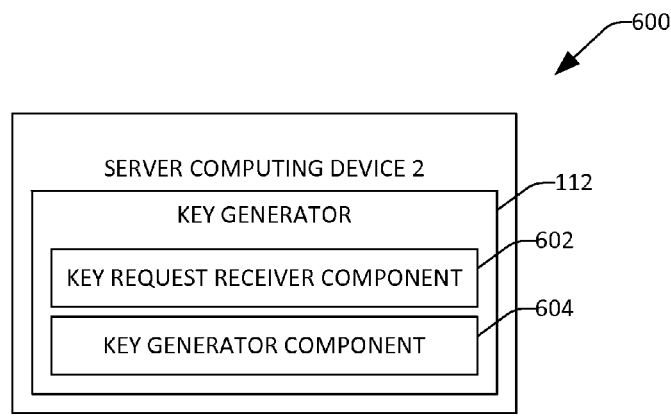
FIG. 6 is a functional block diagram of an exemplary server computing device that is configured to generate a symmetric key for use in connection with generating web tickets.

Now referring to FIG. 6, a second server computing device 600 in the UC server system 106 is illustrated. The second server computing device 600 can be in communication with the first server computing device 500 and can execute the key generator 112. The key generator 112 includes a key request receiver component 602 that receives a request from the ticket issuer 110 for a new symmetric key. A key generator component 604 generates the symmetric key responsive to the key request receiver component 602 receiving the request, and transmits the symmetric key to the requesting ticket issuer. Further, the key generator component 604 can generate a key identifier that can be used to identify the key in a lookup table, and the key generator component 604 can additionally transmit the key identifier to the requesting ticket issuer. Alternatively, the ticket issuer can generate the key identifier. Further, it is to be understood that the key generator 112 can generate keys for more than one ticket issuer.

Figure 7:
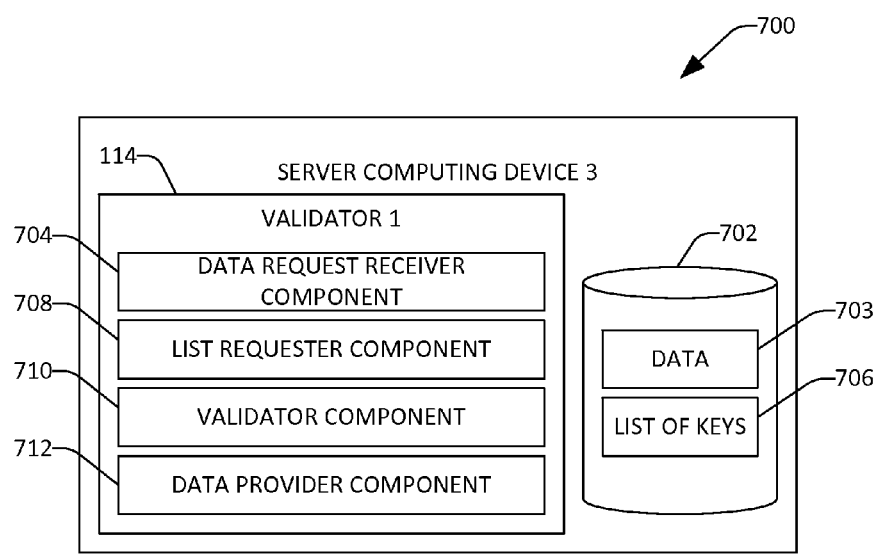
FIG. 7 is a functional block diagram of an exemplary server computing device that is configured to validate a web ticket provided by a client computing device.

Now referring to FIG. 7, a third server computing device 700 in the UC server system 106 is illustrated, wherein the third server computing device 700 executes the first validator 114. The third server computing device 700 includes a data repository 702, wherein the data repository 702 comprises communications data 703. The first validator 114 includes a data request receiver component 704 that receives a request for the communications data 703 from a client computing device, wherein the request includes a web ticket issued by the ticket issuer 110. The data repository 702 may also include a list of keys 706, wherein the list of keys 706 is a list of symmetric keys received previously from the ticket issuer 110. The first validator 114 can include a list requester component 708 that accesses the data repository 702 and reviews the list of keys 706 to ascertain if the list of keys 706 is current. If the list of keys 706 in the data repository 702 is not current, then the collection requester component 708 can request a list of keys from the ticket issuer 110 (as identified in the received web ticket). Such list of keys may be retained in the data repository 702 as the list of keys 706.

The validator 114 also includes a validator component 710 that can validate the web ticket, and thus authenticate the user of the requesting client computing device. For instance, the validator component 710 can review the web ticket to ascertain a field therein is missing. If the validator component 720 determines that a field is missing (e.g., any field in the web ticket), then the validator component 720 can reject the request for the data 703. Further, the validator component 710 can analyze the field in the web ticket that identifies when the web ticket expires. If the validator component 720 determines that the web ticket has expired, the validator component 710 rejects the request for the communications data 703. If the web ticket has not expired, the validator component 710 can extract the signature from the web ticket and can validate the signature using a symmetric key from the list of keys 706 identified in the web ticket. The first validator 114 further comprises a data provider component 712 that is in communication with the validator component 710. If the validator component 710 finds that the web ticket is valid, the data provider component 712 can cause the requested communications data 703 to be transmitted to the requesting client computing device. If the validator component 710 finds that the signature is invalid, then the request from the client is rejected.

FIGS. 8-11 illustrate exemplary methodologies relating to creation and use of web tickets to authenticate a user. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
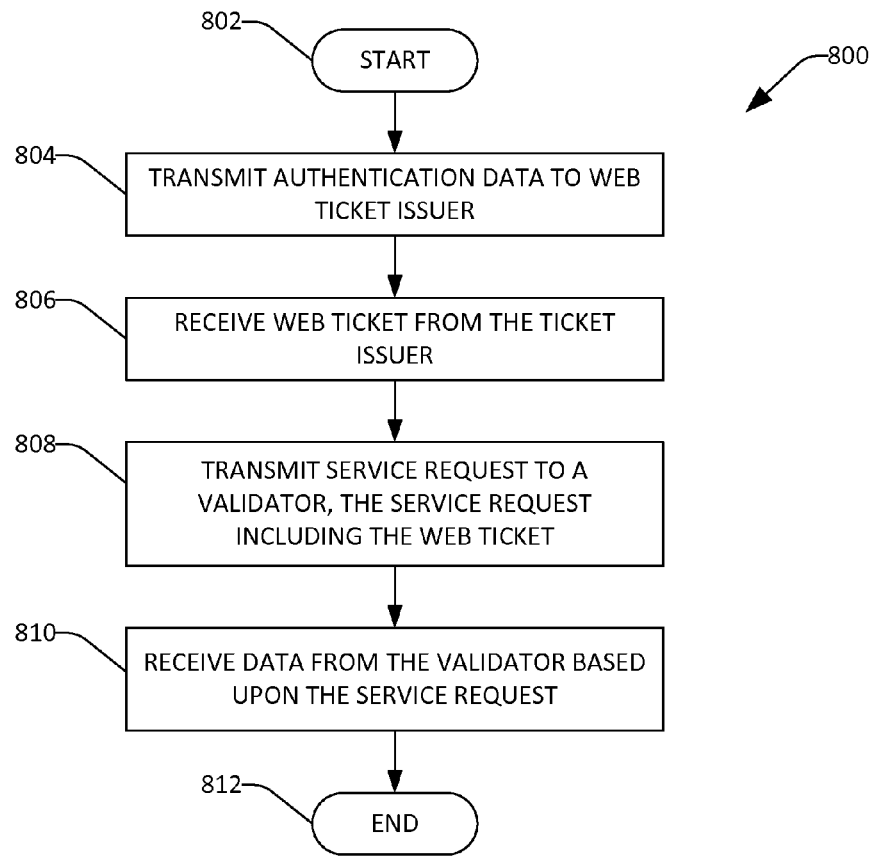
FIG. 8 is a flow diagram that illustrates an exemplary methodology executed by a client computing device in connection with authenticating a user to a server computing device through use of a web ticket.

With reference now FIG. 8, an exemplary methodology 800 that can be executed by a client computing device for receiving and using a web ticket in connection with authenticating a user is illustrated. The methodology 800 starts at 802, and at 804 authentication data is transmitted to a web ticket issuer. At 806, the client receives the web ticket from the web ticket issuer responsive to the web ticket issuer authenticating the authentication data transmitted at 804.

At 808, a data request is transmitted to a validator, wherein the data request includes the web ticket received at 806. At 810, responsive to the validator validating the web ticket, the requested data from the validator is received at 810. The methodology 800 completes at 812.

Figure 9:
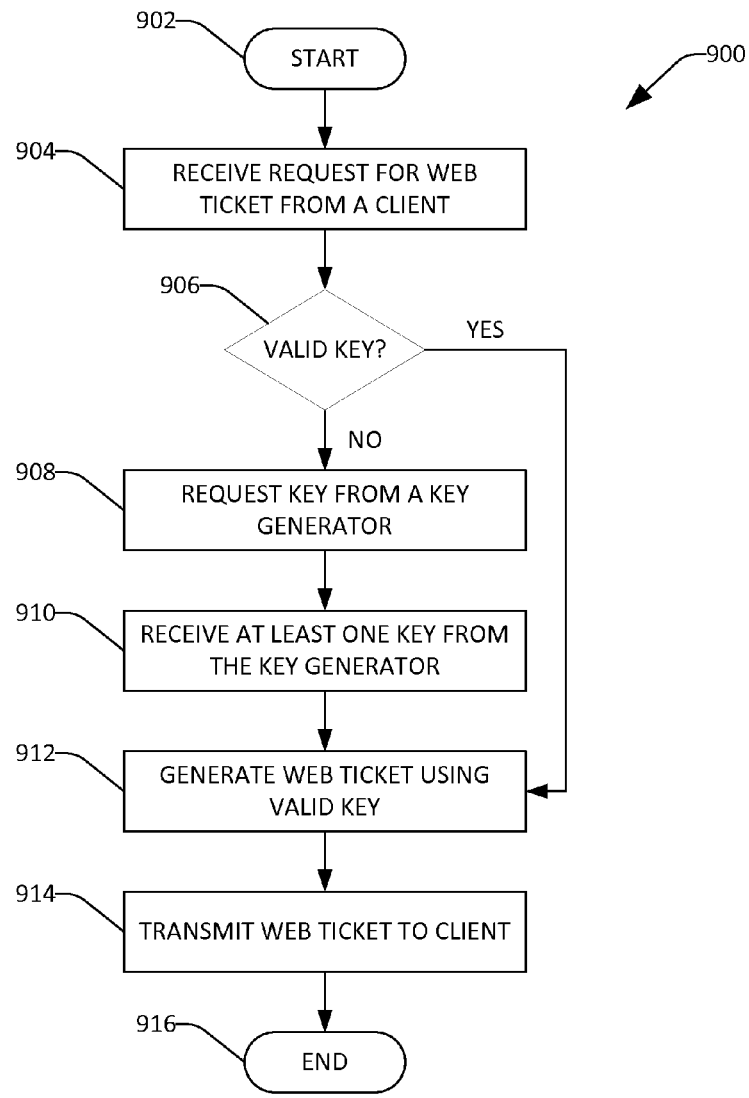
FIG. 9 is a flow diagram that illustrates an exemplary methodology executed by a ticket issuer in connection with generating a web ticket.

Now referring to FIG. 9, an exemplary methodology 900 that can be executed by a ticket issuer in connection with generating a web ticket is illustrated. The methodology 900 starts at 902, and at 904 a request for a web ticket is received from a client computing device. At 906, the ticket issuer analyzes a maintained list of symmetric keys to ascertain if the list of keys includes a symmetric key that is employable to generate a web ticket (e.g., the symmetric key has not expired). If the web ticket issuer does not have an unexpired symmetric key for generating a web ticket, then at 908 the web ticket issuer can transmit a request for a symmetric key to a key generator. Alternatively, if configured to do so, the ticket issuer can generate the symmetric key. At 910, responsive to transmitting the request to the key generator, at least one key can be received from the key generator. In some instances, the key generator can transmit multiple keys (e.g., three keys) to the web ticket issuer, wherein a first key is to be immediately used by the ticket issuer to generate web tickets, while the second and third keys are to be used subsequently to generate web tickets. For instance, the first key can be used to generate web tickets during hour one, the second key can be used to generate web tickets during hour two, and the third key can be used to generate web tickets during hour three. Accordingly, the ticket issuer is provided with a queue of symmetric keys and can provide requesting validators with such queue.

At 912, responsive to receiving the at least one key from the key generator at 910, or responsive to determining that the ticket issuer already has access to a valid key, at 912 the web ticket requested by the client computing device is generated. At 914, the web ticket is transmitted to the client computing device, and the methodology 900 completes at 916.

Figure 10:
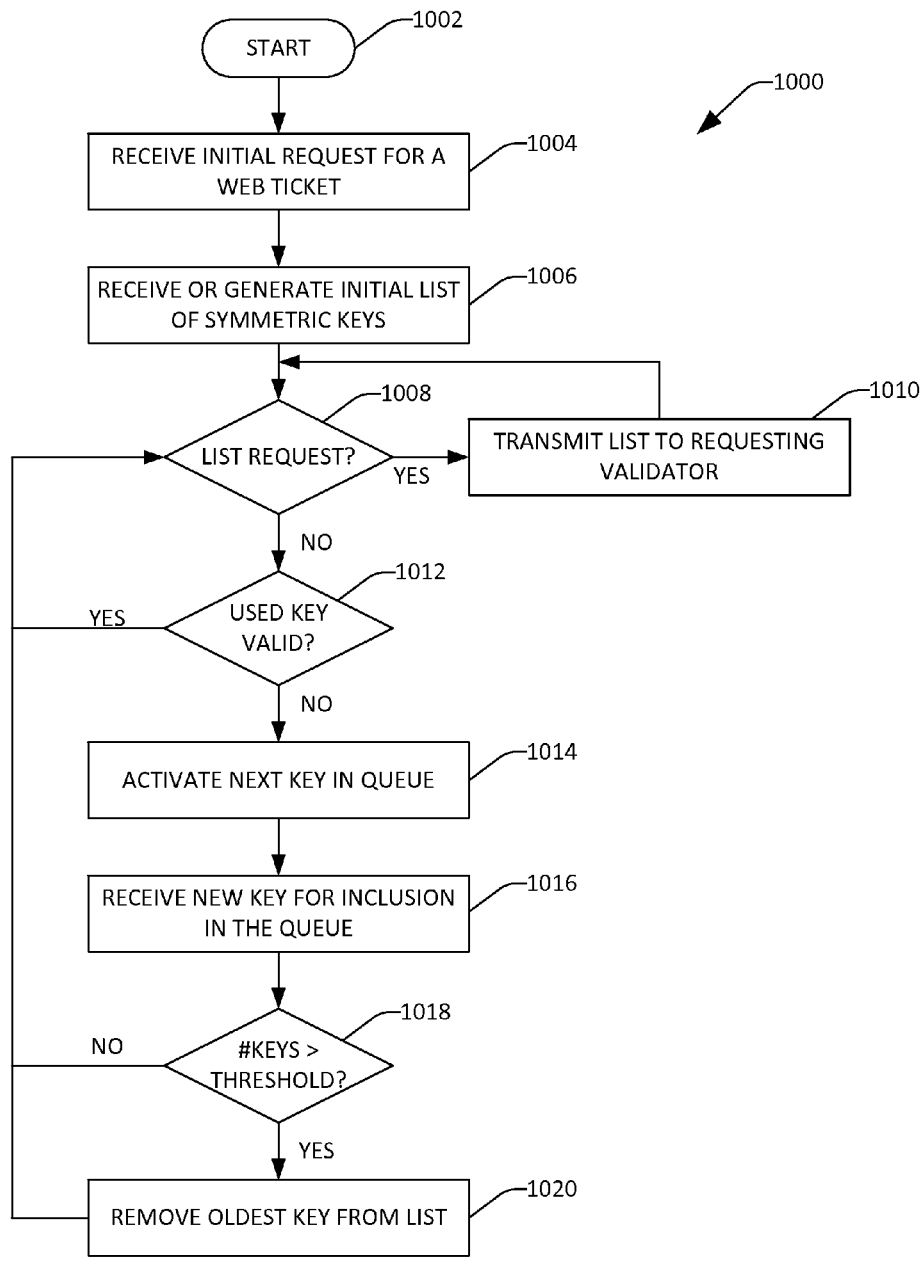
FIG. 10 is a flow diagram that illustrates an exemplary methodology executed by a key generator that facilitates generation of keys used to create web tickets.

With reference now to FIG. 10, an exemplary methodology 1000 that can be executed by a ticket issuer in connection with maintaining a list of keys and providing the list of keys to a requesting validator is illustrated. The methodology 1000 starts 1002, and at 1004, an initial request for a web ticket is received from a client computing device. At 1006, an initial list of symmetric keys is received or generated. The initial list of symmetric keys, in an exemplary embodiment, can include a plurality of keys: a first key that is to be immediately used by the ticket issuer to generate web tickets; a second key that is to be used to generate web tickets immediately after the first key expiring, and a third key that is to be used to generate web tickets immediately after the second key expiring. Thus, the list includes a queue of two keys that have yet to be employed by the ticket issuer to generate web tickets.

At 1008, a determination is made regarding whether a validator has requested the list of symmetric keys. If a request has been received from the validator, then the list of symmetric keys maintained by the ticket issuer is transmitted to the requesting validator at 1010, and thereafter the methodology 1000 returns to act 1008. It can be ascertained that the list includes two symmetric keys that have yet to be used by the ticket issuer. Inclusion of such keys can allow the requesting validator to use the list at future times without having to request an updated list from the ticket issuer. Furthermore, inclusion of such keys can take into consideration differences in clocks used by server computing devices.

At 1012, a determination is made regarding whether a most recent key used by the ticket issuer to generate web tickets remains valid. In other words, a determination is made if a threshold window of time within which the key can be used to generate web tickets has expired. If it is found that the key remains valid, then the methodology 1000 can return to act 1008.

If it is determined at 1012 that the key is no longer valid for use in connection with generating web tickets, then at 1014 the next key in queue in the list of symmetric keys is activated for use by the ticket issuer to generate web tickets. At 1016, a new key is received or generated for inclusion in the queue, such that the queue again includes two symmetric keys.

At 1018, a determination is made regarding whether the number of keys in the list of symmetric keys (after adding the new key to the queue) is greater than a predefined threshold. In other words, a determination is made regarding whether the oldest key in the list is associated with any valid web tickets. If it is determined that the number of keys in the list of keys is greater than the threshold, then at 1020 the oldest key is removed from the list. When it is determined at 1018 that the number of keys is not greater than the threshold, or subsequent to removing the oldest key from the list of keys, the methodology 1000 returns to act 1008.

If At 1006, a determination is made regarding whether the ticket issuer has a key collection retained or accessible thereto. If it is determined at 1006 that the ticket issuer does not include or have access to a key collection (e.g., this is the first request for a web ticket since a server executing the ticket issuer has been started), then at 1008, three symmetric keys can be generated. At 1010, respective expiration times can be assigned to the three keys. For instance, each key may be used by the ticket issuer for some period of time and the expiration times can include non-overlapping time ranges that are sequential.

Figure 11:
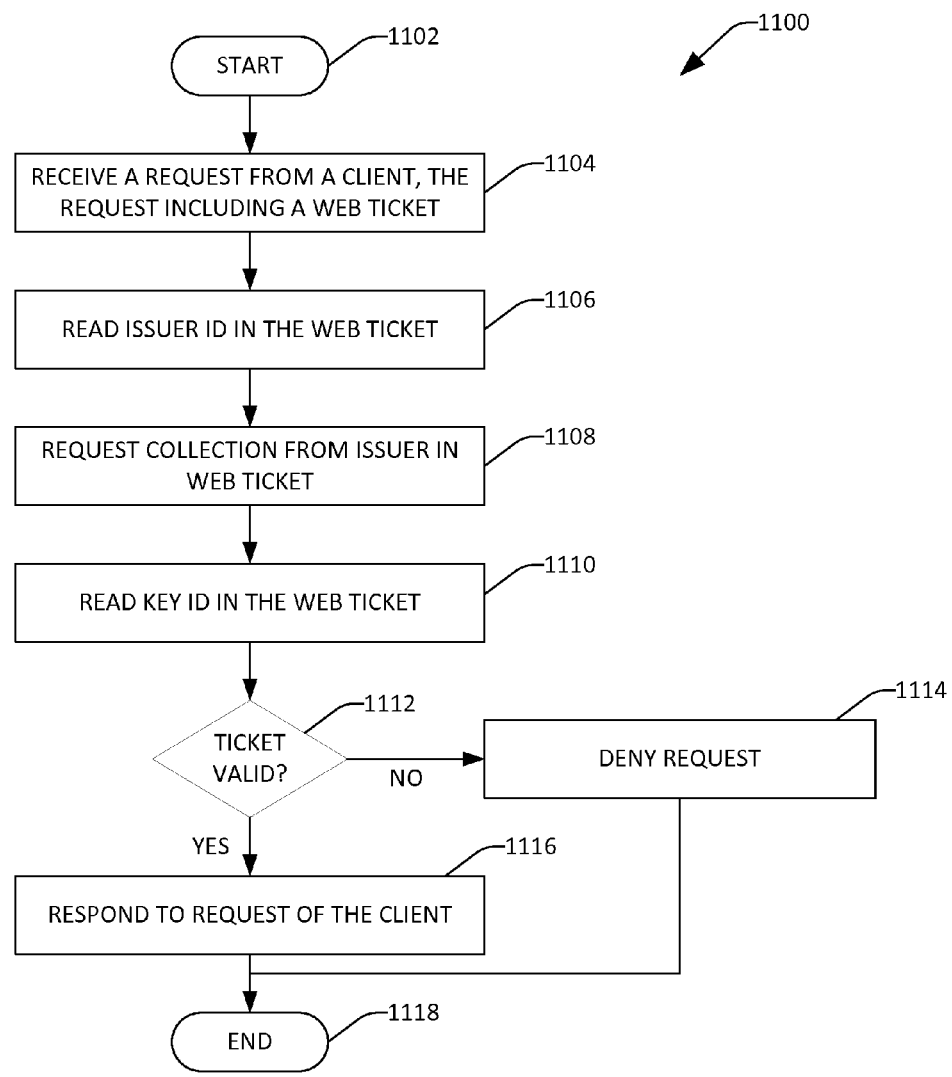
FIG. 11 is a flow diagram that illustrates an exemplary methodology executed by a validator that facilitates authenticating a user based upon a web ticket.

Now referring to FIG. 11, an exemplary methodology 1100 that can be executed by a validator in connection with validating a web ticket, and thereby authenticating a user, is illustrated. The methodology 1100 starts 1102, and at 1104, a request is received from a client computing device for communications data, wherein the request includes a web ticket. At 1106, an issuer identifier is read from the web ticket, and at 1108, a list of symmetric keys is requested from the ticket issuer identified in the web ticket. It is to be understood that in some cases, the validator will already have a valid list of symmetric keys in its cache, such that act 1108 is optional.

At 1110, a key identifier is read from the web ticket. At 1112, a determination is made regarding whether the web ticket is valid based upon content of the web ticket and/or the key. For instance, at 1112 a determination as to whether the web ticket has expired can be ascertained. Further, the signature can be extracted from the web ticket and validated based upon the key identified in the web ticket. If it is determined at 1112 that the web ticket is not valid, than at 1114 the request from the client is denied. If it is determined that 1112 that the web ticket is valid, then at 1116, a response to the request of the client is transmitted to the client, wherein the response includes the requested data. The methodology completes at 1118.

Figure 12:
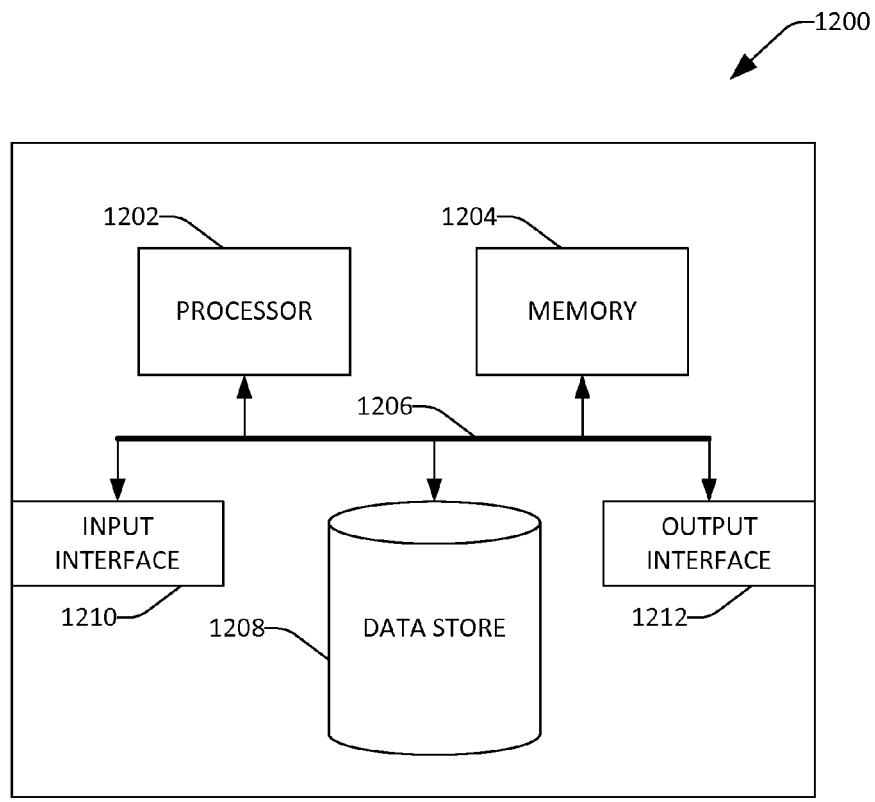
FIG. 12 is an exemplary computing system.

Referring now to FIG. 12, a high-level illustration of an exemplary computing device 1200 that can be used in accordance with the systems and methodologies disclosed herein is illustrated. For instance, the computing device 1200 may be used in a system that supports generation of a web ticket based upon a symmetric key. By way of another example, the computing device 1200 can be used in a system that supports maintaining a list of symmetric keys. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store a list of symmetric keys, communications data, web tickets, etc.

The computing device 1200 additionally includes a data store 1208 that is accessible by the processor 1202 by way of the system bus 1206. The data store 1208 may include executable instructions, a list of symmetric keys, web tickets, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A client computing device that is configured to perform a plurality of acts when executing a client-side instance of a unified communications application, the plurality of acts comprising:

transmitting a request for a web ticket to a first server that executes a first server-side instance of the unified communications application, the request for the web ticket comprises authentication data of a user of the client computing device for the unified communications application;

subsequent to transmitting the request for the web ticket, receiving the web ticket from the first server, the web ticket comprising a hash-based signature that is based upon a symmetric key shared between the first server and a second server, the second server executes a second server-side instance of the unified communications application that is configured to maintain lists of contacts of users of the unified communications application, the symmetric key being valid for use when generating web tickets for a first length of time, the web ticket further comprising data that identifies the first server, data that identifies the user, and data that indicates that the web ticket is valid for a second length of time that is greater than the first length of time, wherein the web ticket has a size of less than 200 bytes;

transmitting a request for a list of contacts of the user to the second server, the list of contacts maintained by the second server-side instance of the unified communications application, wherein the request for the list of contacts comprises the web ticket; and receiving the list of contacts from the second server based upon the request for the list of contacts, the list of contacts received responsive to the second instance of the unified communications application validating the hash-based signature through use of the symmetric key.

2. The client computing device of claim 1 being a mobile computing device.

3. The client computing device of claim 1 being a mobile telephone.

4. The client computing device of claim 1 configured to transmit the web ticket with each request for the list of contacts subsequent to receiving the web ticket from the first server and prior to the web ticket expiring.

5. The client computing device of claim 4, wherein the web ticket is valid for a time period between one hour and one day.

6. The client computing device of claim 1, wherein the web ticket further comprises data that identifies the first server as the ticket issuer server.

7. The client computing device of claim 1, wherein the unified communications application supports a plurality of communications modalities, the modalities comprising instant messaging, presence of contacts, screen sharing, group maintenance, video conferencing, and telephone conferencing.

8. The client computing device of claim 1, wherein the web ticket comprises data that indicates a time when the web ticket is to expire.

9. A method executed by a client computing device when executing a client-side instance of a unified communications application, the method comprising:

receiving a web ticket from a first server that executes a ticket issuer for a unified communications application, the web ticket being less than 200 bytes in size and comprising data that identifies the ticket issuer, data that identifies a user of the client computing device, and a hash-based signature that is based upon a symmetric key that is shared between the first server and a second server, the second server executes a server-side instance of the unified communications application that is configured to maintain lists of contacts of users of the unified communications application, the symmetric key being valid for use when generating web tickets for a first length of time, the web ticket further comprising data that indicates that the web ticket is valid for a second length of time that is greater than the first length of time;

transmitting, to the second server, a request for a list of contacts of the user of the client computing device, the list of contacts maintained by the server-side instance of the unified communications application, the request comprising the web ticket;

receiving the list of contacts from the second server responsive to the server-side instance of the unified communications application validating the hash-based signature through use of the symmetric key; and displaying at least one contact in the list of contacts based upon the list of contacts received from the second server.

10. The method of claim 9, the client computing device being one of a mobile telephone, a slate computing device, or a phablet computing device.

11. The method of claim 9, wherein the hash-based signature is a message authentication code signature.

12. The method of claim 9, wherein a Uniform Resource Locator comprises the request transmitted to the second server.

13. The method of claim 9, wherein the web ticket comprises an identifier that is usable by the second server to retrieve the symmetric key from a list of symmetric keys.

14. The method of claim 9, wherein the web ticket comprises a field that indicates a time when the web ticket expires.

15. The method of claim 9, further comprising transmitting multiple requests to the second server, wherein each request in the multiple requests comprises the web ticket.

16. A computer-readable storage medium of a client computing device executing a client-side instance of a unified communications application, the computer-readable storage medium comprising instructions that, when executed by a processor, cause the processor to perform acts comprising:

transmitting a request to a first server that executes a first server-side instance of the unified communications application, the request comprising data that identifies a user of the client computing device;

receiving a response to the request from the first server, the response comprising a web ticket that has a size of less than 200 bytes, the web ticket comprising a hash-based signature that is based upon a symmetric key shared between the first server and a second server, the second server executes a second server-side instance of the unified communications application that is configured to maintain lists of contacts of users of the unified communications application, the symmetric key being valid for use when generating web tickets for a first length of time, the web ticket further comprising data that identifies the first server, data that identifies the user, and data that indicates that the web ticket is valid for a second length of time that is greater than the first length of time;

subsequent to receiving the response from the first server, transmitting a second request to the second server for a list of contacts of the user maintained by the second server-side instance of the unified communications application, the request comprising the web ticket;

receiving a response from the second server that comprises the list of contacts, the response received responsive to the second instance of the unified communications application validating the hash-based signature through use of the symmetric key; and displaying graphical data on a display screen of the client computing device, the graphical data comprises at least one contact in the list of contacts.

17. The computer-readable storage medium of claim 16, wherein the client computing device is a mobile computing device.

18. The computer-readable storage medium of claim 17, wherein the mobile computing device is a mobile telephone.

19. The computer-readable storage medium of claim 16, wherein the web ticket further comprises data that identifies the first server as an issuer of the web ticket.

20. The computer-readable storage medium of claim 16, the acts further comprising transmitting multiple requests to the second server, wherein each request in the multiple requests comprises the web ticket.

* * * * *